(12) United States Patent
Kundiyana et al.

(10) Patent No.: US 12,234,435 B2
(45) Date of Patent: Feb. 25, 2025

(54) SYSTEMS AND METHODS FOR PROCESSING JUICE

(71) Applicant: BlueSky IP, LLC, Modesto, CA (US)

(72) Inventors: Dimple K Kundiyana, Modesto, CA (US); Nick Dokoozlian, Modesto, CA (US); Timothy Holt, Modesto, CA (US); Thomas Blair, Modesto, CA (US); Ravi Ponangi, Modesto, CA (US); Leah Chapin, Modesto, CA (US)

(73) Assignee: BlueSky IP, LLC, Modesto, CA (US)

( * ) Notice: Subject to any disclaimer, the term of this patent is extended or adjusted under 35 U.S.C. 154(b) by 260 days.

(21) Appl. No.: 17/374,807

(22) Filed: Jul. 13, 2021

(65) Prior Publication Data
US 2023/0016781 A1    Jan. 19, 2023

(51) Int. Cl.
| | |
|---|---|
| *C12G 1/02* | (2006.01) |
| *A23L 2/04* | (2006.01) |
| *A23L 2/10* | (2006.01) |
| *A23N 1/00* | (2006.01) |
| *B01D 15/18* | (2006.01) |
| *C13B 20/14* | (2011.01) |

(52) U.S. Cl.
CPC ............. *C12G 1/02* (2013.01); *A23L 2/04* (2013.01); *A23L 2/10* (2013.01); *A23N 1/00* (2013.01); *B01D 15/1828* (2013.01); *C13B 20/148* (2013.01); *B01D 2215/023* (2013.01)

(58) Field of Classification Search
CPC .... C12G 1/02; A23L 2/04; A23L 2/10; A23N 1/00; B01D 15/1828; B01D 2215/023; C13B 20/148
USPC .......................................................... 426/15
See application file for complete search history.

(56) References Cited

U.S. PATENT DOCUMENTS

| | | | | |
|---|---|---|---|---|
| 4,468,407 A | * | 8/1984 | Vella .................... | C12H 6/04 |
| | | | | 426/384 |
| 6,203,826 B1 | * | 3/2001 | Calvin ................... | C12G 3/025 |
| | | | | 426/11 |
| 2016/0213048 A1 | * | 7/2016 | Blase .................... | A23L 2/02 |

FOREIGN PATENT DOCUMENTS

| | | | | |
|---|---|---|---|---|
| FI | 115968 | * | 8/2005 | ............... A23L 2/78 |
| WO | 20140030030 | * | 2/2014 | |
| WO | WO-2020/070669 A1 | | 4/2020 | |

OTHER PUBLICATIONS

Mukulsain, Refractive window drying—A better approach to preserve the visual appearance of dried products, Pantnagar Journal of Research 9, vol. 18(1), Jan.-Apr. 2020 (Mukulsain).*
English Google Translation of FI115968; Aug. 2005.*
SMB Chromatography Applied to the Separation/Purification of Fructose From Cashew Apple Juice Braz. J. Chem. Eng. v.17 n.4-7 São Paulo dic. 2000.*

(Continued)

*Primary Examiner* — Donald R Spamer
*Assistant Examiner* — Philip A Dubois
(74) *Attorney, Agent, or Firm* — Dentons US LLP (57) ABSTRACT

This disclosure relates to a method and a system for processing grapes. An example system includes a simulated moving bed (SMB) device configured to receive a feed stream and an eluent stream as inputs and provide an extract stream and a raffinate stream as outputs. The feed stream includes a grape juice, the extract stream includes a high-sugar grape juice, and the raffinate stream includes a low-sugar grape juice. The system also includes fermentation equipment configured to produce a low-alcohol wine from the low-sugar grape juice.

16 Claims, 10 Drawing Sheets

(56) References Cited

OTHER PUBLICATIONS

International Search Report and Written Opinion for International Patent Application No. PCT/US2022/034533, Sep. 23, 2022 (10 pages).
Gomes, P. S., "Simulated Moving Bed Technology: Old and New," Adsorption (2006) 12:375-392.
Lee, Ju Weon, "Expanding Simulated Moving Bed Chromatography into Ternary Separations in Analogy to Dividing Wall Column Distillation," Ind. Eng. Chem. Res. (2020), 59, 9619-9628.
Wang, Linda, "Simulated Moving Bed Technologies," available at https://depts.washington.edu/cpac/Activities/Meetings/Satellite/2009/Monday/Wang2009Rome.pdf, downloaded on Feb. 22, 2023.
"AmberLite™ Uniform Particle Size Ion Exchange Resins; Chromatographic Separation of Fructose and Glucose with AmberLite™ CR99 Ion Exchange Resins; Technical Manual," Version 0, available at https://www.dupont.com/content/dam/dupont/amer/us/en/water-solutions/public/documents/en/IER-AmberLite-Separation-Fructose-Glucose-Manual-45-D02252-en.pdf, Aug. 2020.

* cited by examiner

SYSTEMS AND METHODS FOR PROCESSING JUICE

TECHNICAL FIELD

The following disclosure relates to systems and methods for processing juice obtained from grapes or other fruit or plant products and, in certain examples, to systems and methods for performing a separation process on grape juice and deriving various food and beverage products from the separated constituents.

BACKGROUND

The production of juice can begin by crushing and pressing harvested grapes or fruit. For the production of wine, a grape juice can be subjected to a fermentation process in which yeast converts sugar in the juice into alcohol. The resulting wine can be clarified (e.g., using filters) and aged (e.g., in wooden barrels) before the wine is bottled for consumption.

The final alcohol concentration in wine can depend on various factors, including an initial sugar concentration, fermentation time, and temperature. There is a need, however, for improved systems and methods for controlling the alcohol concentration in wine products.

The foregoing discussion, including the description of motivations for some embodiments of the invention, is intended to assist the reader in understanding the present disclosure, is not admitted to be prior art, and does not in any way limit the scope of any of the claims.

SUMMARY

In certain examples, this disclosure relates to systems and methods for producing low-alcohol wine products. A grape juice can be separated into a high-sugar grape juice and a low-sugar grape juice using a continuous separation process, which can be or include a simulated moving bed (SMB) ion-exchange process. The low-sugar grape juice can be fermented to produce a low-alcohol wine. The high-sugar grape juice can be used to produce one or more beverage products.

In other examples, this disclosure relates to systems and methods for producing fructose and glucose materials. A grape juice can be separated into a fructose stream and a glucose stream using a continuous separation process, which can be or include an SMB ion-exchange process. The fructose and glucose streams can be subjected to evaporation and/or drying processes to produce fructose crystals and glucose crystals, respectively. The fructose and glucose crystals can be used as additives in a variety of food and beverage products.

In general, in one aspect, the subject matter of this disclosure relates to a method of processing grape juice. The method includes: providing as inputs to a simulated moving bed (SMB) ion-exchange device (alternatively referred to herein as "SMB device") a feed stream and an eluent stream, the feed stream including a grape juice; receiving as outputs from the SMB device an extract stream and a raffinate stream, the extract stream including a high-sugar grape juice and the raffinate stream including a low-sugar grape juice; and providing the low-sugar grape juice to a process for making low-alcohol wine.

In another aspect, the subject matter of this disclosure relates to a system for processing grape juice. The system includes: a simulated moving bed (SMB) ion-exchange device configured to receive a feed stream and an eluent stream as inputs and provide an extract stream and a raffinate stream as outputs, the feed stream including a grape juice, the extract stream including a high-sugar grape juice, and the raffinate stream including a low-sugar grape juice; and fermentation equipment configured to produce a low-alcohol wine from the low-sugar grape juice.

In another aspect, the subject matter of this disclosure relates to a wine product. The wine product includes: a low-alcohol wine produced by fermentation of a low-sugar grape juice obtained from a simulated moving bed (SMB) process having (i) a feed stream including a grape juice and (ii) a raffinate stream including the low-sugar grape juice.

In another aspect, the subject matter of this disclosure relates to a method of processing grape juice. The method includes: providing as inputs to a simulated moving bed (SMB) ion-exchange device a feed stream and an eluent stream, the feed stream including a grape juice; receiving as outputs from the SMB device an extract stream and a raffinate stream, the extract stream including a high concentration of fructose and a low concentration of glucose and the raffinate stream including a high concentration of glucose and a low concentration of fructose; and removing water from the extract stream to produce fructose crystals and from the raffinate stream to produce glucose crystals.

In another aspect, the subject matter of this disclosure relates to a system for processing grape juice. The system includes: a simulated moving bed (SMB) ion-exchange device configured to receive a feed stream and an eluent stream as inputs and provide an extract stream and a raffinate stream as outputs, the feed stream including a grape juice, the extract stream including a high concentration of fructose and a low concentration of glucose, and the raffinate stream including a high concentration of glucose and a low concentration of fructose; at least one evaporator and at least one dryer for removing water from the extract stream and the raffinate stream to produce fructose crystals from the extract stream and glucose crystals from the raffinate stream.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, "degrees Brix" (or ° Brix) can refer to a sugar content of an aqueous solution. The sugar can be or include glucose, fructose, sucrose, or any combination thereof. For example, 5 degrees Brix (5° Brix) can correspond to a total sugar concentration (e.g., including glucose, fructose, sucrose, or combinations thereof) of 5 grams per 100 mL. In examples involving juice derived from grapes or other fruit or plant materials, as described herein, the sugar in the juice is typically glucose and/or fructose, with little or no sucrose (e.g., typically 0.5% or less, by weight).

Figure 1:
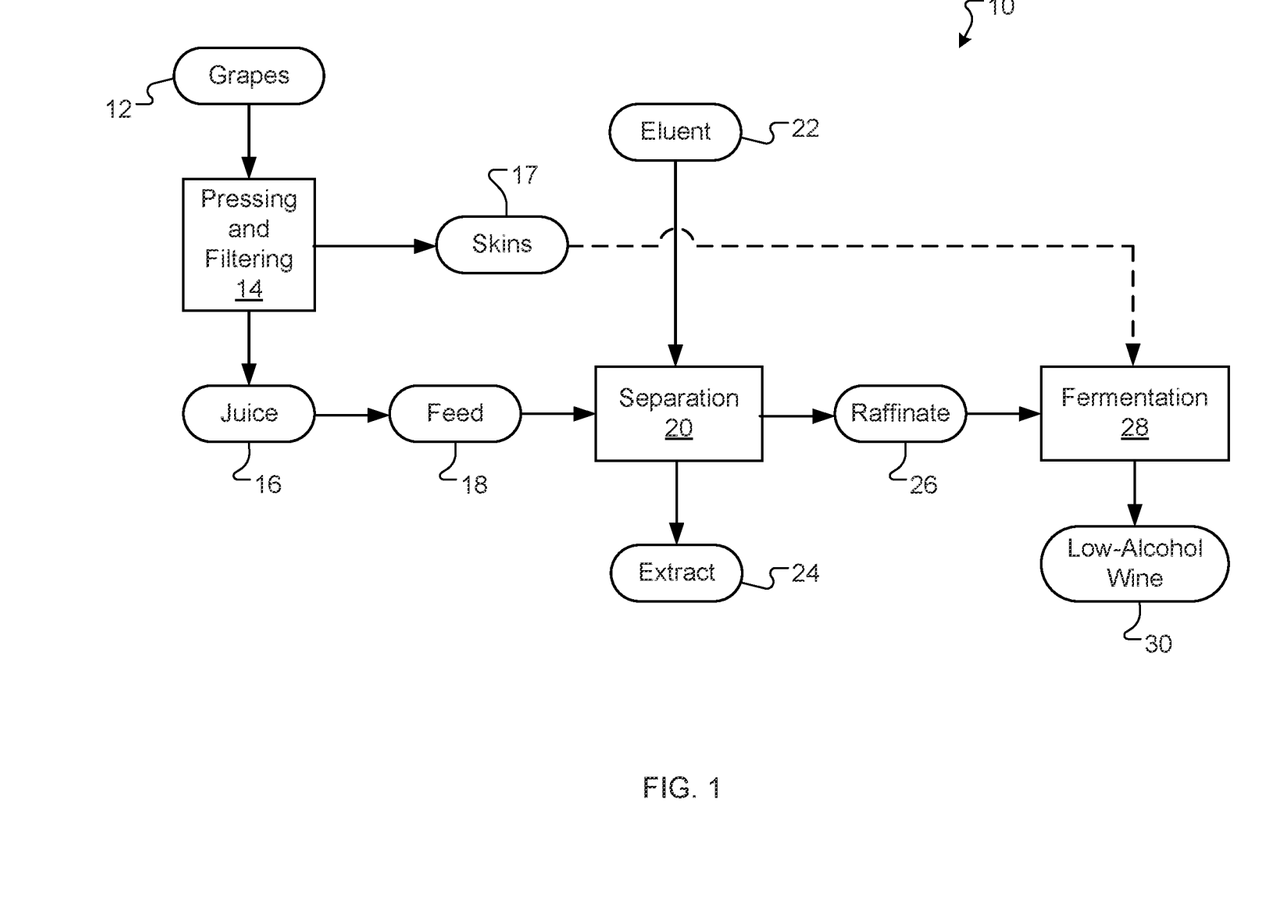
FIG. 1 is schematic diagram of a method of processing grapes or other fruit to produce a low-alcohol wine, in accordance with certain embodiments.

FIG. 1 is a schematic diagram of a method 10 of processing grapes or other fruit or plant materials, in accordance with certain examples. Harvested grapes 12 can be provided to a pressing and filtering process 14 that produces a grape juice 16 and grape skins 17. The grape juice 16 can be provided as a feed stream 18 to a separation process 20, which can be a continuous separation process, such as a Simulated Moving Bed (SMB) ion-exchange process. Other types of separation techniques can be used in the separation process 20, such as filtration, osmosis, evaporation, condensation, freezing, distillation, and/or ion exchange. An eluent stream 22 can be provided as an additional input to the separation process 20. The separation process 20 can be used to separate one or more chemical compounds from one or more other chemical compounds and can provide an extract stream 24 and a raffinate stream 26 as outputs. The extract stream 24 can be or include a high-sugar grape juice, which can have a glucose and/or fructose concentration of about 15° Brix, or from about 0.5° Brix to about 30° Brix. The raffinate stream 26 can be or include a low-sugar grape juice, which can have a glucose and/or fructose concentration of about 6° Brix, or from about 0.5° Brix to about 30° Brix. The low-sugar grape juice can be used in a fermentation process 28 to produce a low-alcohol wine 30, which can have an alcohol by volume (ABV) concentration of about 2-3% or from about <0.5% to about 13%. In some instances (e.g., involving red grapes), the grape skins 17 or a portion thereof can be combined with the low-sugar grape juice and used in the fermentation process 28.

In various examples, the eluent stream 22 can be or include water and/or a low brix juice, which can have a sugar content of about 1° Brix, or from about 0° Brix to about 3° Brix. The low brix juice can be a juice for fermentation. For example, the low brix juice can resemble or be associated with wine or grape juice or can otherwise have a vinous character or a juice character. For example, the low brix juice can be derived from grapes or grape juice, which can be the same as or similar to the grapes 12 or the grape juice 16, respectively. In some instances, the low brix juice and the grape juice 16 can be derived from a common grape variety (e.g., Chardonnay, Sauvignon Blanc, Riesling, Cabernet Sauvignon, etc.) or combinations thereof. The low brix juice can be obtained by processing a grape juice in a thermal gradient process and/or a separation process, which can involve evaporation, condensation, and/or filtration, as described herein.

Figure 2A:
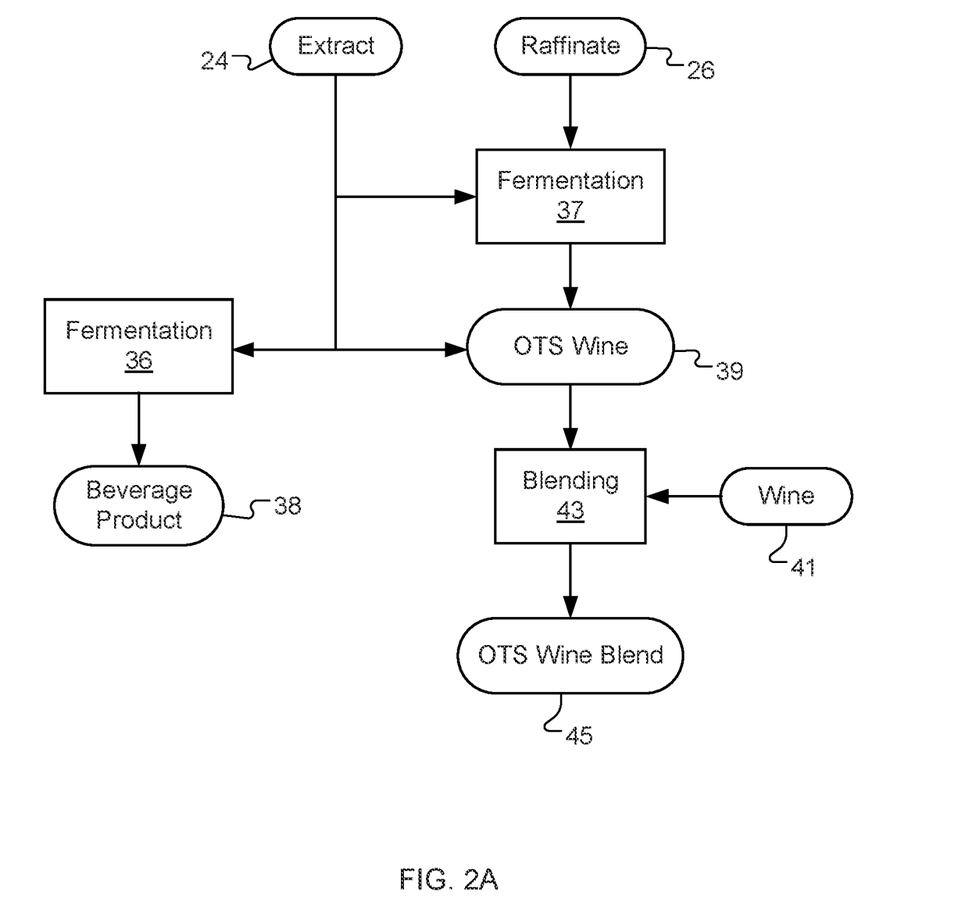
FIG. 2A is a schematic diagram of a method of producing beverage products from an extract stream and a raffinate stream, in accordance with certain embodiments.

Referring to FIG. 2A, the high-sugar grape juice from the extract stream 24 can be used for a variety of purposes and/or to produce various products. In some instances, for example, the high-sugar grape juice can be provided to a fermentation process 36 that can be used to produce a beverage product 38, such as an alcoholic beverage. Alternatively or additionally, the high-sugar grape juice from the extract stream 24 (or a portion thereof) can be combined or blended with the low-sugar grape juice from the raffinate stream 26 (or a portion thereof). The resulting blend can be used in a fermentation process 37 to produce an alcoholic beverage 39. By blending the high-sugar grape juice with the low-sugar grape juice, the resulting alcoholic beverage 39 can have a higher alcohol concentration.

Additionally or alternatively, in some implementations, the high-sugar grape juice from the extract stream 24 (or a portion thereof) can be combined or blended with the alcoholic beverage 39. This can increase a sugar content of the alcoholic beverage 39 and/or can introduce certain flavors, aromas, and/or colors to the alcoholic beverage 39.

Figure 2B:
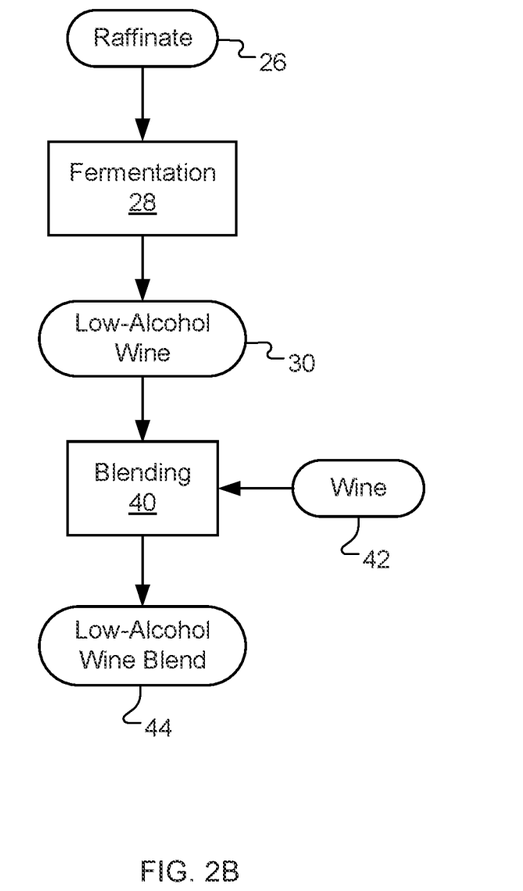
FIG. 2B is a schematic diagram of a method of producing a low-alcohol wine blend, in accordance with certain embodiments.

Referring to FIG. 2B, in some implementations, the low-alcohol wine 30 produced from the fermentation process 28 can be combined with a different wine 42 in a blending process 40 to produce a low-alcohol wine blend 44. Compared to the low-alcohol wine 30, the low-alcohol wine blend 44 can have a higher alcohol content and/or can have certain flavors, aromas, and/or colors that may not be present in the low-alcohol wine 30. In various examples, the low-alcohol wine 30 and the wine 42 can be derived from a common grape variety. The wine 42 can be a conventional wine (e.g., a Chardonnay, a Pinot Noir, or a Cabernet Sauvignon) and/or can have an alcohol by volume (ABV) concentration from about 10% to about 18%, or about 14%. The low-alcohol wine blend 44 can have an ABV concentration from about <0.5% to about 13%, or about 2-3%. The low-alcohol wine 30 and the low-alcohol wine blend 44 can be bottled and/or packaged and sold to consumers.

Figure 2C:
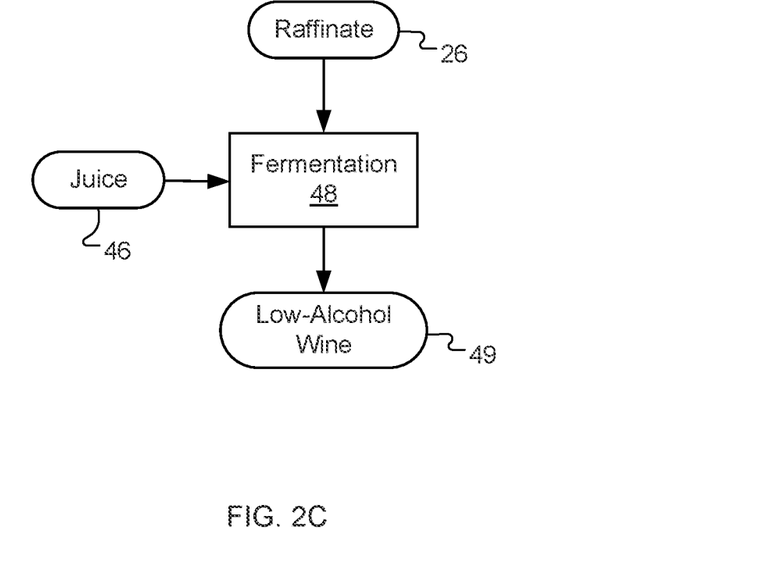
FIG. 2C is a schematic diagram of a method of producing a low-alcohol wine, in accordance with certain embodiments.

Referring to FIG. 2C, in some instances, the raffinate 26 can be combined with a standard grape juice 46 (e.g., a grape juice produced by pressing and filtering grapes, such as the grape juice 16) in a fermentation process 48 for producing a low-alcohol wine 49. The combination of the raffinate 26 and the standard grape juice 46 can have a lower sugar concentration, compared to the standard grape juice 46. The sugar concentration (e.g., residual sugar concentration) of the mixture of the raffinate 26 and the standard grape juice 46 can be, for example, from about 5° Brix to about 24° Brix, from about 12° Brix to about 20° Brix, or about 16° Brix. In one example, about 42 L of the raffinate 26 can be combined with about 58 L of the standard grape juice 46 to produce about 100 L of a mixture having a sugar concentration of about 16° Brix.

Figure 3:
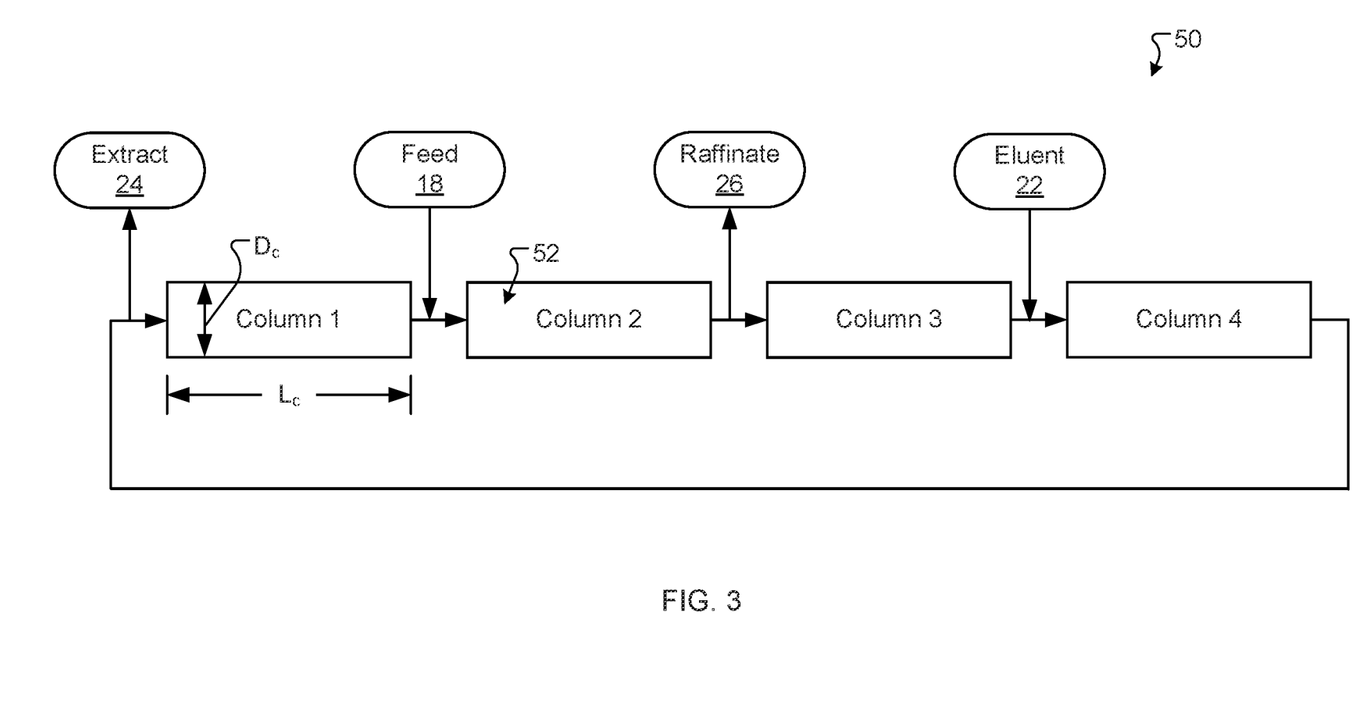
FIG. 3 is a schematic diagram of a simulated moving bed (SMB) ion-exchange device used to perform a separation process, in accordance with certain embodiments.
Figure 4A:
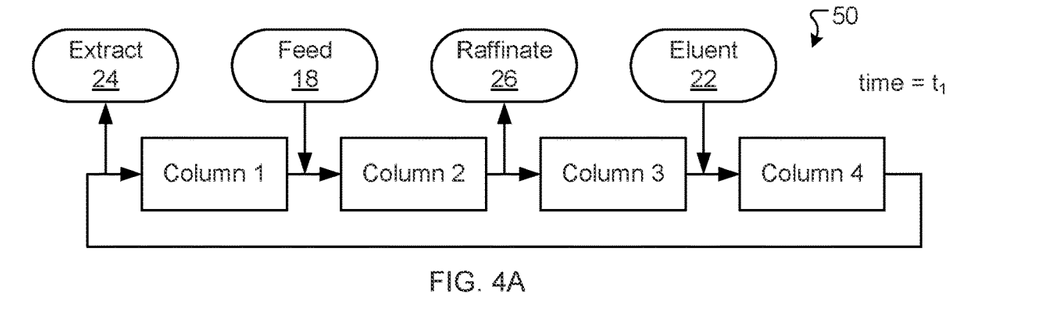
FIGS. 4A-4D are schematic diagrams of the SMB device of FIG. 3 at different times, in accordance with certain embodiments.
Figure 4B:
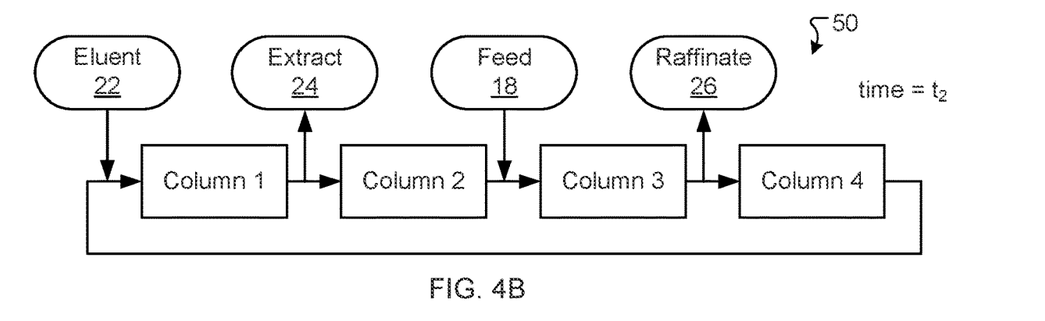
Figure 4C:
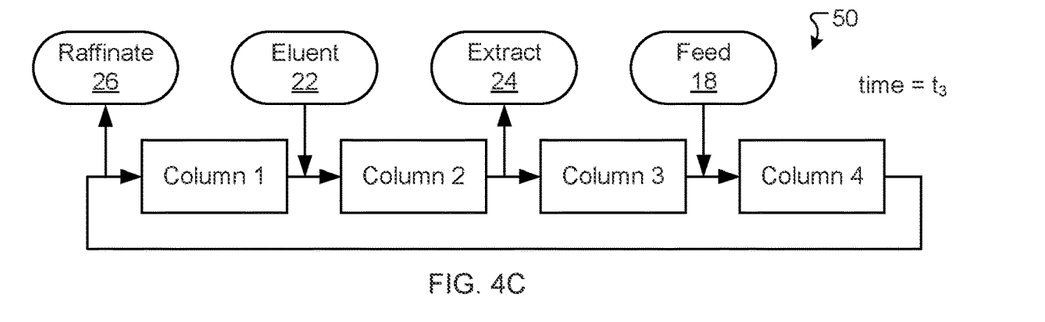
Figure 4D:
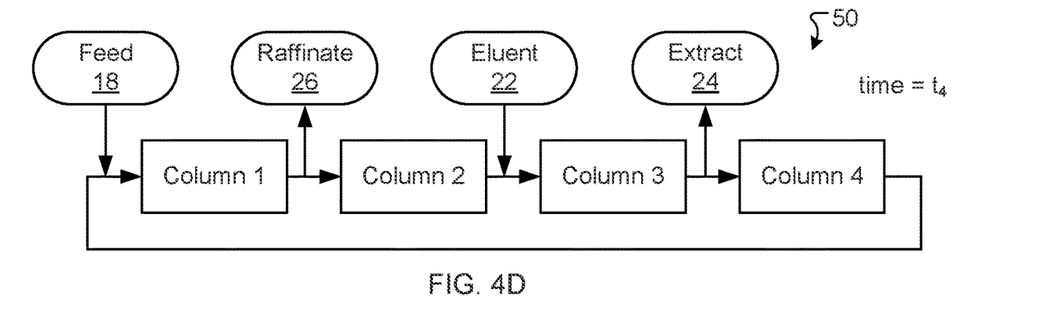

Referring to FIG. 3, in various examples, the systems and methods described herein utilize a Simulated Moving Bed (SMB) device 50 for performing a separation (e.g., in the separation process 20). The SMB device 50 includes four columns: column 1, column 2, column 3, and column 4. Other implementations can utilize a different number of columns (e.g., 2, 8, 12, or more). In general, liquid can flow through the columns in series, from column 1, to column 2, to column 3, to column 4, and back to column 1. Inputs to the SMB device 50 include the feed stream 18 and the eluent stream 22, which can be located before column 2 and column 4, respectively. Outputs from the SMB device 50 include the extract stream 24 and the raffinate stream 26, which can be located before column 1 and column 3, respectively. Each column can be substantially cylindrical and hollow. For a production scale unit, a diameter $D_c$ for each column (e.g., an inner or outer diameter) can be from about 1.2 m to about 6.5 m, or about 4.2 m. An axial length $L_c$ of each column can be from about 1.2 m to about 8.8 m, or about 2.7 m. An internal volume of each column can be from about 2,000 L to about 120,000 L, or about 40,000 L. A fraction of the internal volume that is occupied by resin particles can be from about 0.62 to about 0.69, or about 0.65.

Each column in the SMB device 50 can include or be packed with a bed of resin particles 52 having one or more surface-active compounds. As liquid flows through the columns 1, 2, 3, and 4, constituents within the liquid can travel through the columns 1, 2, 3, and 4 at different velocities or flowrates, depending on an affinity each constituent has for the particles. In general, constituents (e.g., chemical compounds) that have a high affinity for the particles travel more slowly through the column, while constituents that have a low affinity for the particles travel more quickly through the column. In various examples, the resin particles can be or include DOWEX 99 MONOSPHERE resin, BAYER LEWATIT MDS 1368 resin, MITSUBISHI UBK 520M resin, MITSUBISHI UBK 522M resin, MITSUBISHI UBK 530 resin, MITSUBISHI UBK 532 resin, and/or MITSUBISHI UBK 535 resin. The resin particles can have surfaces or volumes that are functionalized with ions, such as potassium or calcium ions ($K^+$ or $Ca^{2+}$), that bond to glucose and/or fructose or can otherwise have a high affinity for sugar constituents, such as glucose and/or fructose. This can cause glucose and/or fructose constituents within the liquid to flow through the columns more slowly, while other constituents (e.g., water) can flow through the columns more quickly. This difference in flowrate or velocity through the columns can result in a separation of the glucose and/or fructose constituents from the other constituents. The inputs and outputs to the SMB device 50 are positioned such that the extract steam 24 can have a high sugar concentration (e.g., a high glucose and/or high fructose concentration), while the raffinate stream 26 can have a low sugar concentration. Techniques for sugar juice purification are described in U.S. Pat. No. RE36,361, reissued on Nov. 2, 1999, the entire disclosure of which is incorporated by reference herein. A simulated moving bed process is described in U.S. Pat. No. 5,102,553, issued on Apr. 7, 1992, the entire disclosure of which is incorporated by reference herein.

To simulate a movement of the particles through the columns, the inputs and outputs can be advanced or rotated to different locations over time (e.g., at periodic intervals). For example, FIGS. 4A, 4B, 4C, and 4D show the input and output locations for the SMB device 50 at successive times $t_1$, $t_2$, $t_3$, and $t_4$, respectively, where $t_2=t_1+\Delta t$, $t_3=t_2+\Delta t$, $t_4=t_3+\Delta t$, and $\Delta t$ is a time interval (e.g., about 1 minute, 10 minutes, or 1 hour). The figures show that each input and output has been advanced by one column, in a direction of the liquid flow, after each time interval. The SMB device 50 can include valves, tubing, piping, actuators, switches, controllers (e.g., programmable logic controllers), a user interface, related software, and/or other components configured to implement the advancement or rotation of the inputs and outputs over time. In various examples, the inputs and outputs can be advanced or rotated at each time interval $\Delta t$. A refractometer and/or density meter can be used to quantify sugar concentrations in process streams.

Figure 5:
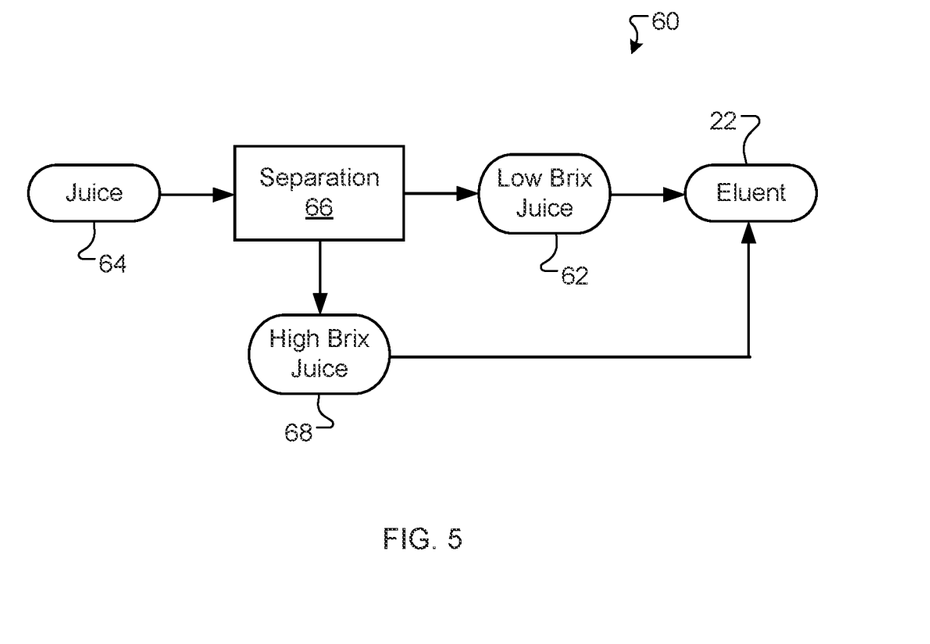
FIG. 5 is a schematic diagram of a separation process used to produce a low brix juice, in accordance with certain embodiments.

Referring to FIG. 5, in some examples, a method 60 can be used to produce a low brix juice 62 that can be used to form the eluent stream 22. A grape juice 64 can be provided as an input to a separation process 66. The grape juice 64 can be or include juice obtained from pressed grapes or other fruit or plant products and/or can be or include a juice concentrate. The separation process 66 can separate the grape juice 64 into the low brix juice 62 component and a high brix juice 68 component. The eluent stream 22 can be formed from the low brix juice 62 or from a combination of the low brix juice 62 and the high brix juice 68. For example, a portion of the high brix juice 68 can be added to the low brix juice 62 to achieve a sugar concentration (e.g., a glucose and/or fructose concentration) for the eluent stream 22 that is higher than a sugar concentration for the low brix juice 62. The high brix juice 68 and the low brix juice 62 can be blended in various proportions to achieve a desired sugar concentration for the eluent stream 22.

The separation process 66 can use or include one or more of a variety of separation techniques, such as, for example, evaporation, condensation, distillation, and/or filtration. In some instances, for example, the separation process 66 utilizes a filter (e.g., a membrane, a membrane system, or a spinning cone filter) that prevents or restricts passage of sugar, such as glucose and/or fructose. The filter can be used to produce the low brix juice 62 as a permeate and the high brix juice 68 as a retentate. A sugar content of the low brix juice 62 and the high brix juice 68 obtained by filtration can be, for example, less than about 7° Brix and greater than about 30° Brix, respectively.

Additionally or alternatively, in some examples, the separation process 66 can utilize an evaporator and/or a condenser. For example, the separation process 66 can use a vacuum and/or heat to evaporate water (and other volatile constituents) from the grape juice 64. The evaporated water can be condensed (e.g., in a condenser) and collected to form a condensate, which can have little or no sugar (e.g., 0° Brix). Constituents from the grape juice 64 that did not evaporate can form a grape juice concentrate having a high sugar concentration, such as about 50° Brix to about 80° Brix, or about 70° Brix. The low brix juice 62 in this example can be formed from the condensate and/or the high brix juice 68 can be formed from the concentrate. A portion of the concentrate (e.g., the high brix juice 68) can be added to the condensate (e.g., the low brix juice 62) to form the eluent stream 22 having a desired sugar concentration. For example, the eluent stream 22 can be or include a low brix juice and/or can have a total sugar concentration (e.g., fructose and/or glucose) of at least about 1° Brix.

In general, the separation process 66 can utilize one or more separation techniques described in U.S. Pat. No. 6,990,748, issued Jan. 31, 2006, titled "Method and Apparatus for Evaporating Liquid from a Product," and/or U.S. Pat. No. 8,790,717, issued Jul. 29, 2014, titled "Natural Crystalline Colorant and Process for Production," the entire disclosures of which are incorporated by reference herein. When an evaporator is used in the separation process 66, the evaporator can be or include, for example, an L&A evaporator (e.g., manufactured by L&A PROCESS SYSTEMS), a thermally accelerated short time evaporator (T.A.S.T.E.), or a mechanical vapor recompression (MVR) evaporator. The separation process 66 preferably does not introduce any water, steam, or other materials to the grape juice 64, such that the low brix juice 62, the high brix juice 68, and the eluent 22 can be derived entirely from the grape juice 64.

Figure 6:
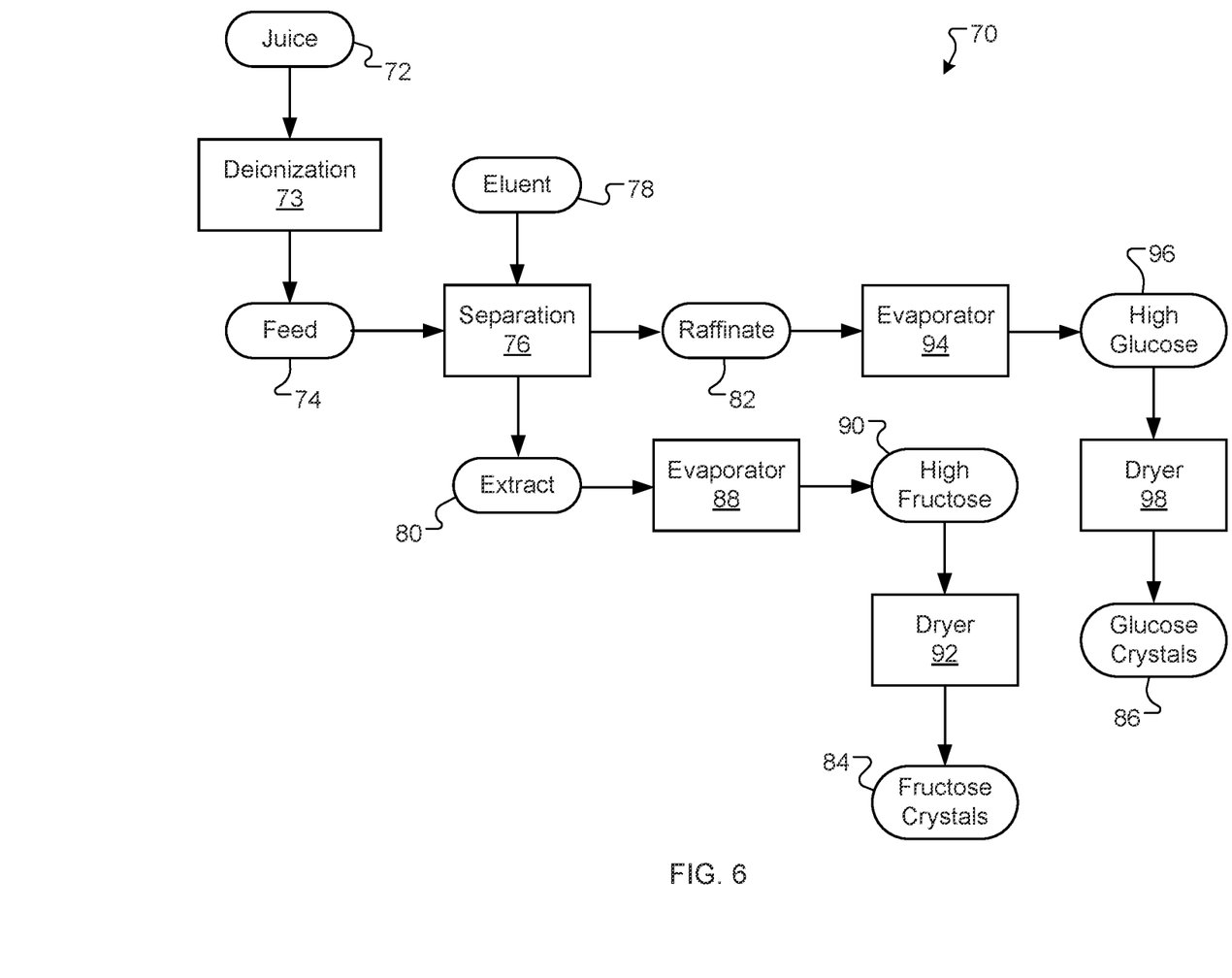
FIG. 6 is a schematic diagram of a method of producing fructose crystals and glucose crystals from a juice, in accordance with certain embodiments.

Referring to FIG. 6, in some instances, a method 70 can be used to obtain a stream of glucose and a stream of fructose from a juice made from grapes or other fruit or plant material. A grape juice 72 or grape juice concentrate (e.g., including the grape juice 16 or the high-sugar grape juice from the extract stream 24, described above) can be provided as input to a deionization process 73 that removes one or more ions (e.g., potassium ions) from the grape juice 70 and provides as output a deionized juice. In alternative examples, the deionization process 73 is not used and/or the grape juice 72 and the deionized juice can be identical. The grape juice 72 (or the deionized juice) can be used as a feed stream 74 to a separation process 76. The separation process 76 is preferably an SMB ion-exchange process; however, other separation processes can be used instead of or in addition to the SMB ion-exchange process, such as filtration, evaporation, condensation, distillation, and/or ion exchange. An eluent stream 78 can be provided as an additional input to the separation process 76 and can be or include, for example, water, deionized water, or a low brix juice, as described herein. The separation process 76 can be used to separate glucose and fructose from one more other chemical compounds and can provide an extract stream 80 and a raffinate stream 82 as outputs. The extract stream 80 can be or include a liquid having fructose with little or no glucose. A total sugar or fructose concentration for the extract stream 80 can be from about 5° Brix to about 50° Brix, or about 25° Brix. The raffinate stream 82 can be or include a liquid having glucose with little or no fructose. A total sugar or glucose concentration for the raffinate stream 82 can be from about 5° Brix to about 50° Brix, or about 25° Brix.

In certain examples, the separation process 76 can utilize an SMB device and method, such as the SMB device 50 and corresponding methods, described herein. The SMB device can have a bed of resin particles that are or include DOWEX 99 MONOSPHERE resin, BAYER LEWATIT MDS 1368 resin, MITSUBISHI UBK 520M resin, MITSUBISHI UBK 522M resin, MITSUBISHI UBK 530 resin, MITSUBISHI UBK 532 resin, and/or MITSUBISHI UBK 535 resin. The resin particles can have surfaces that are functionalized with ions (e.g., potassium, $K^+$, calcium, or $Ca^{2+}$ ions) that bond to fructose or otherwise have a high affinity for fructose. This can cause fructose molecules within the liquid to flow through the columns of the SMB device more slowly, while other constituents (e.g., glucose and water) can flow through the columns more quickly. This difference in flowrate or velocity through the columns can result in a separation of the fructose from the glucose or other constituents. The inputs and outputs to the SMB device can be positioned such that the extract steam 80 can have a high fructose concentration and the raffinate stream 82 can have a high glucose concentration. In other examples, resin particles can be chosen that have a high affinity for glucose, such that the extract steam 80 has a high glucose concentration and the raffinate stream 82 has a high fructose concentration.

The extract steam 80 and the raffinate stream 82 can be further processed to produce fructose crystals 84 and glucose crystals 86, respectively. For example, the extract stream 80 can be processed in an evaporator 88, which can remove water and/or other volatile constituents and output a high-fructose stream 90. Compared to the extract stream 80, the high-fructose stream 90 can have a fructose concentration that is higher by about a factor of 3 or 4. The high-fructose stream 90 can then be dried in a dryer 92 to remove additional water and/or other volatile constituents and output the fructose crystals 84. Likewise, the raffinate stream 82 can be processed in an evaporator 94, which can remove water and/or other volatile constituents and output a high-glucose stream 96. Compared to the raffinate stream 82, the high-glucose stream 96 can have a glucose concentration that is higher by about a factor of 3 or 4. The high-glucose stream 96 can then be dried in a dryer 98 to remove additional water and/or other volatile constituents and output the glucose crystals 86. The dryer 92 and/or the dryer 98 can be or include a refractive window dryer. Additionally or alternatively, the dryer 92 and/or the dryer 98 can utilize freeze drying in which the high-fructose stream 90 and the high-glucose stream 96 (or portions thereof) can be frozen and subjected to low pressure, such that ice is removed by sublimation. Other drying techniques can be used. Drying and evaporation techniques and equipment are described in U.S. Pat. No. 6,990,748, issued Jan. 31, 2006, titled "Method and Apparatus for Evaporating Liquid from a Product," and U.S. Pat. No. 8,790,717, issued Jul. 29, 2014, titled "Natural Crystalline Colorant and Process for Production," the entire disclosures of which are incorporated by reference herein.

The fructose crystals 84 and the glucose crystals 86 produced using the method 70 can be used for a variety of purposes. In some instances, for example, the fructose crystals 84 and/or the glucose crystals 86 can be added to a fermentation process for producing an alcoholic beverage. The addition of the fructose crystals 84 and/or the glucose crystals 86 can increase an alcohol content of the alcoholic beverage. Additionally or alternatively, the fructose crystals 84 and/or the glucose crystals 86 can be added to one or more food or beverage products, alcoholic beverages (e.g., seltzers), non-alcoholic beverages, flavored water, pharmaceutical formulations, pet foods, ready-to-eat (RTE) foods, soft drinks, candy, dessert products, and/or other culinary recipes. The addition of the fructose crystals 84 and/or the glucose crystals 86 can improve or enhance a flavor, aroma, or feel of the food or beverage products. Advantageously, production of the fructose crystals 84 and the glucose crystals 86 produced using the method 70 can give food and beverage producers greater control over the flavor, smell, feel and other characteristics of food and beverage products.

Table 1 includes low, high, and typical values for various parameters associated with the systems and methods described herein for producing low-alcohol wine (e.g., the method 10), in accordance with certain examples. Each listed value can be a minimum, maximum, or average value. Various embodiments include any parameter value (e.g., integer or decimal value) within the cited ranges. For example, the sugar concentration (e.g., combined glucose and fructose concentration) of the feed stream can be greater than, less than, or equal to 12, 13, 14, . . . , 29, or 30 g/100 mL (° Brix). Express support and written description of these values for each parameter are hereby represented.

TABLE 1

Exemplary parameters for low-alcohol wine production.

| Ingredient | Low | Typical | High |
|---|---|---|---|
| Sugar conc. of Feed stream (g/100 mL) | 12 | 22 | 30 |
| Sugar conc. of Eluent stream (g/100 mL) | 0 | 1 | 3 |
| Sugar conc. of Extract stream (g/100 mL) | 0.5 | 15 | 30 |
| Sugar conc. of Raffinate stream (g/100 mL) | 0.5 | 6 | 30 |
| Feed stream flowrate (L/min) | 1 | 10 | 200 |
| Eluent stream flowrate (L/min) | 1 | 10 | 200 |
| Extract stream flowrate (L/min) | 1 | 10 | 200 |
| Raffinate stream flowrate (L/min) | 1 | 10 | 200 |
| Alcohol conc. of low-alcohol wine (ABV %) | <0.5 | 2-3 | 13 |
| Alcohol conc. of low-alcohol wine blend (ABV %) | <0.5 | 2-3 | 13 |
| SMB single column diameter, $D_c$ (m) | 1.2 | 4.2 | 6.5 |
| SMB single column length, $L_c$ (m) | 1.2 | 2.7 | 8.8 |
| SMB single column volume $V_c$ (L) | 2,000 | 40,000 | 120,000 |
| Fraction of SMB column occupied by resin | 0.59 | 0.65 | 0.72 |
| Time interval for input switching $\Delta t$ (minutes) | 5 | 20 | 60 |

Table 2 includes low, high, and typical values for various parameters associated with the systems and methods described herein for producing glucose and fructose crystals (e.g., the method 70), in accordance with certain examples. Each listed value can be a minimum, maximum, or average value. Various embodiments include any parameter value (e.g., integer or decimal value) within the cited ranges. For example, the glucose concentration of the feed stream can be greater than, less than, or equal to 5, 6, 7, . . . , 49, or 50 g/100 mL (° Brix). Express support and written description of these values for each parameter are hereby represented.

TABLE 2

Exemplary parameters for production of glucose crystals and fructose crystals

| Ingredient | Low | Typical | High |
|---|---|---|---|
| Glucose conc. of Feed stream (g/100 mL) | 5 | 25 | 50 |
| Fructose conc. of Feed stream (g/100 mL | 5 | 25 | 50 |
| Glucose conc. of Eluent stream (g/100 mL) | 0 | 0.5 | 1 |
| Fructose conc. of Eluent stream (g/100 mL) | 0 | 0.5 | 1 |
| Glucose conc. of Extract stream (g/100 mL) | 0 | 0 | 5 |
| Fructose conc. of Extract stream (g/100 mL) | 5 | 25 | 50 |
| Glucose conc. of Raffinate stream (g/100 mL) | 5 | 25 | 50 |
| Fructose conc. of Raffinate stream (g/100 mL) | 0 | 1 | 5 |
| Glucose conc. of high-glucose stream (g/100 mL) | 30 | 60 | 99 |
| Fructose conc. of high-glucose stream (g/100 mL) | 0 | 3 | 10 |
| Glucose conc. of high-fructose stream (g/100 mL) | 0 | 1 | 10 |

TABLE 2-continued

Exemplary parameters for production of glucose crystals and fructose crystals

| Ingredient | Low | Typical | High |
|---|---|---|---|
| Fructose conc. of high-fructose stream (g/100 mL) | 30 | 80 | 99 |
| Glucose conc. of glucose crystals (wt %, dry basis) | 80 | 95 | 99.5 |
| Fructose conc. of glucose crystals (wt %, dry basis) | 0 | 0 | 1 |
| Glucose conc. of fructose crystals (wt %, dry basis) | 0 | 0 | 1 |
| Fructose conc. of fructose crystals (wt %, dry basis) | 80 | 95 | 99.5 |

Figure 7:
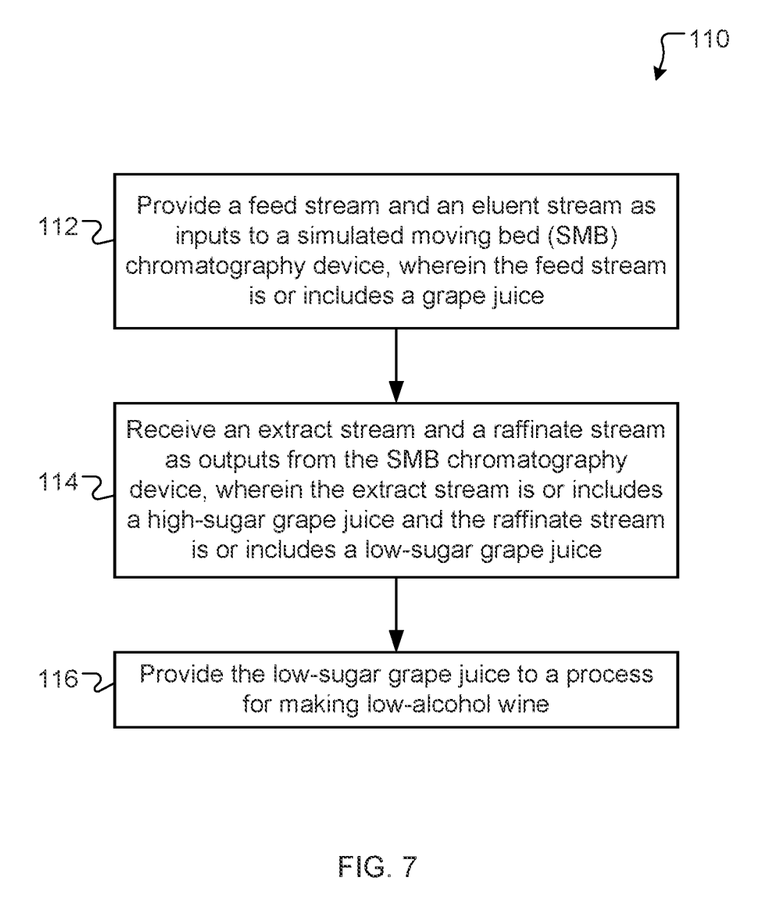
FIG. 7 is a flowchart of a method of processing a grape juice to produce a low-alcohol wine, in accordance with certain embodiments.

FIG. 7 is a flowchart of an example method 110 of processing a grape juice. A feed stream and an eluent stream are provided (step 112) as inputs to a simulated moving bed (SMB) ion-exchange device. The feed stream is or includes a grape juice (e.g., obtained from pressed grapes). An extract stream and a raffinate stream are received (step 114) as outputs from the SMB device. The extract stream is or includes a high-sugar grape juice and the raffinate stream is or includes a low-sugar grape juice. The low-sugar grape juice is provided (step 116) to a process for making low-alcohol wine.

Figure 8:
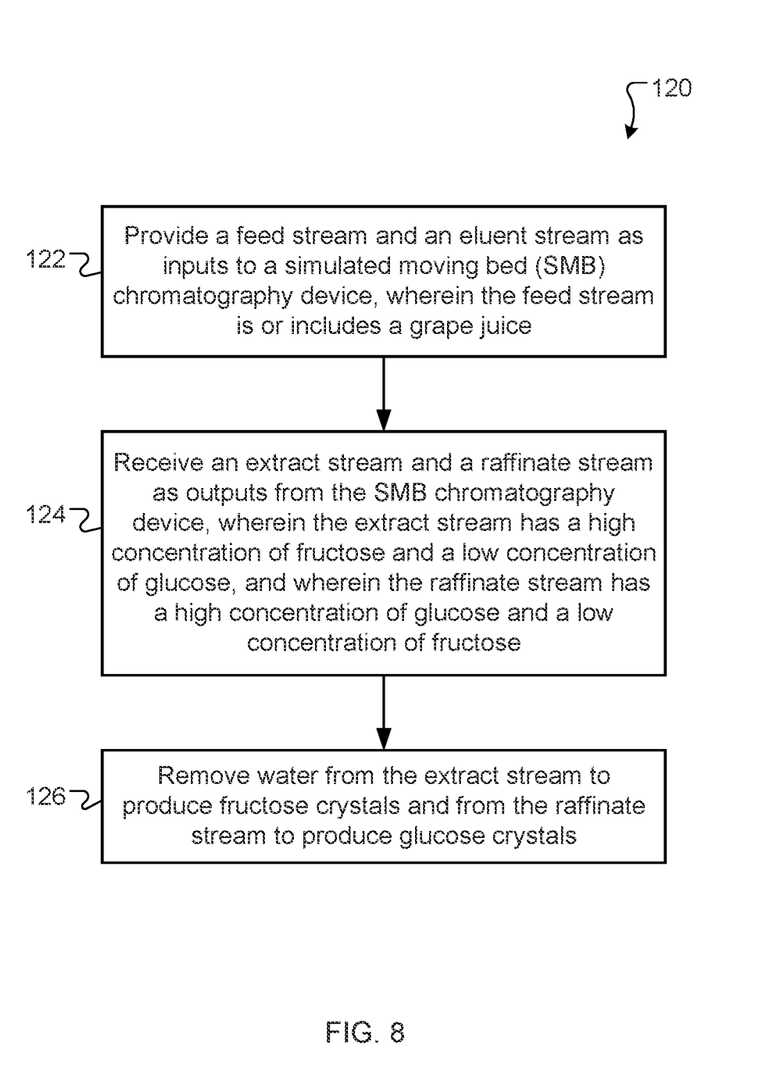
FIG. 8 is a flowchart of a method of processing a grape juice to produce fructose crystals and glucose crystals, in accordance with certain embodiments.

FIG. 8 is a flowchart of an example method 120 of processing a grape juice. A feed stream and an eluent stream are provided (step 122) as inputs to a simulated moving bed (SMB) ion-exchange device. The feed stream is or includes a grape juice. An extract stream and a raffinate stream are received (step 124) as outputs from the SMB device. The extract stream has a high concentration of fructose and a low concentration of glucose, and the raffinate stream has a high concentration of glucose and a low concentration of fructose. Water is removed (step 126) from the extract stream to produce fructose crystals and from the raffinate stream to produce glucose crystals.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A method of processing grape juice, the method comprising:
   providing as inputs to a simulated moving bed (SMB) device a feed stream and an eluent stream, the feed stream comprising a grape juice, the eluent stream comprising a low brix juice having a sugar content less than or equal to about 3 degrees Brix;
   receiving as outputs from the SMB device an extract stream and a raffinate stream, the extract stream comprising a high-sugar grape juice having a sugar content from about 15 degrees Brix to about 30 degrees Brix and the raffinate stream comprising a low-sugar grape juice having a sugar content from about 0.5 degrees Brix to about 6 degrees Brix; and
   providing the low-sugar grape juice to a process for making low-alcohol wine having an alcohol by volume (ABV) concentration from about <0.5% to about 13%.

2. The method of claim 1, wherein the SMB device comprises at least two columns, and wherein the inputs and the outputs are rotated among the columns at periodic intervals.

3. The method of claim 1, wherein the SMB device comprises a bed of resin particles having an affinity for sugar constituents.

4. The method of claim 1, wherein the low brix juice comprises a sugar content of at least one degree Brix, and wherein the low brix juice comprises a vinous character or a juice character.

5. The method of claim 4, wherein the low brix juice was prepared using at least one of filtration and evaporation.

6. The method of claim 1, wherein the feed stream and the eluent stream are derived from a common grape variety.

7. The method of claim 1, wherein providing the low-sugar grape juice to the process for making low-alcohol wine comprises at least one of (i) blending the low-sugar grape juice with a standard grape juice or (ii) blending the high-sugar grape juice with at least one of the low-sugar grape juice and a low-alcohol wine produced using the process for making low-alcohol wine.

8. The method of claim 1, further comprising providing the high-sugar grape juice to a process for making an alcoholic beverage.

9. The method of claim 8, wherein the alcoholic beverage comprises at least one of a seltzer or a spirit.

10. The method of claim 1, wherein the low brix juice has a sugar content from about 1 degree Brix to about 3 degrees Brix.

11. A method of processing grape juice, the method comprising:
- providing as inputs to a simulated moving bed (SMB) device a feed stream and an eluent stream, the feed stream comprising a grape juice;
- receiving as outputs from the SMB device an extract stream and a separate raffinate stream, the extract stream comprising a fructose concentration from about 5 g/100 mL to about 50 g/100 mL and a glucose concentration less than or equal to about 5 g/100 mL and the raffinate stream comprising a glucose concentration from about 5 g/100 mL to about 50 g/100 mL and a fructose concentration less than or equal to about 5 g/100 mL; and
- removing water from the extract stream to produce fructose crystals and from the raffinate stream to produce glucose crystals.

12. The method of claim 11, wherein the eluent stream comprises deionized water.

13. The method of claim 11, wherein removing water comprises processing the extract stream and the raffinate stream in at least one evaporator and at least one dryer.

14. The method of claim 13, wherein the at least one dryer comprises a refractive window dryer.

15. The method of claim 11, further comprising providing at least one of the glucose crystals and the fructose crystals for use as an additive in a food or beverage product.

16. The method of claim 11, wherein the grape juice comprises deionized grape juice.

\* \* \* \* \*